(12) United States Patent
Kurematsu et al.

(10) Patent No.: US 8,033,938 B2
(45) Date of Patent: *Oct. 11, 2011

(54) HYDRAULIC TENSIONER

(75) Inventors: Yuji Kurematsu, Osaka (JP); Takeshi Ogawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 261 days.

This patent is subject to a terminal disclaimer.

(21) Appl. No.: 12/354,292

(22) Filed: Jan. 15, 2009

(65) Prior Publication Data

US 2009/0209376 A1 Aug. 20, 2009

(30) Foreign Application Priority Data

Feb. 18, 2008 (JP) ................. 2008-035958

(51) Int. Cl.
F16H 7/08 (2006.01)

(52) U.S. Cl. .............. 474/110; 474/109; 474/111

(58) Field of Classification Search .......... 474/109–111, 474/113–115
See application file for complete search history.

(56) References Cited

U.S. PATENT DOCUMENTS

| 5,346,436 | A | 9/1994 | Hunter et al. | |
|---|---|---|---|---|
| 6,716,124 | B2 * | 4/2004 | Markley | 474/110 |
| 7,037,229 | B2 * | 5/2006 | Hayakawa et al. | 474/110 |
| 7,691,017 | B2 * | 4/2010 | Seungpyo et al. | 474/109 |
| 2002/0065159 | A1 * | 5/2002 | Markley | 474/110 |
| 2004/0087399 | A1 * | 5/2004 | Hayakawa et al. | 474/110 |
| 2005/0227799 | A1 | 10/2005 | Yoshida | |
| 2005/0239589 | A1 | 10/2005 | Seungpyo | |
| 2007/0243961 | A1 | 10/2007 | Aimone | |
| 2007/0287562 | A1 * | 12/2007 | Assel | 474/110 |
| 2009/0209377 | A1 * | 8/2009 | Kurematsu et al. | 474/110 |

FOREIGN PATENT DOCUMENTS

| DE | 103 27 024 A1 | 1/2004 |
|---|---|---|
| DE | 10 2007 023 671 A1 | 12/2007 |
| DE | 10 2007 036 119 A1 | 7/2008 |
| DE | 20 2007 002 456 U1 | 8/2008 |
| DE | 20 2007 004 988 U1 | 9/2008 |
| JP | 04-78360 | 7/1992 |
| JP | 07-158703 | 8/1995 |
| JP | 2005-299783 | 10/2005 |
| WO | 2008/089869 A1 | 7/2008 |
| WO | 2008/101526 A1 | 8/2008 |

OTHER PUBLICATIONS

Yuji Kurematsu and Katsuji Shigematsu, Hydraulic Tensioner, U.S. Appl. No. 12/354,460, application filed Jan. 15, 2009.
Yuji Kurematsu, Hydraulic Tensioner, U.S. Appl. No. 12/354,909, application filed Jan. 16, 2009.

* cited by examiner

*Primary Examiner* — Sang Kim
(74) *Attorney, Agent, or Firm* — Howson & Howson LLP

(57) ABSTRACT

In a hydraulic tensioner, at least a part of a bar is located within a coil spring that biases a plunger in the protruding direction. The bar reduces the volume of the high pressure oil chamber of the tensioner.

5 Claims, 10 Drawing Sheets

Fig.1
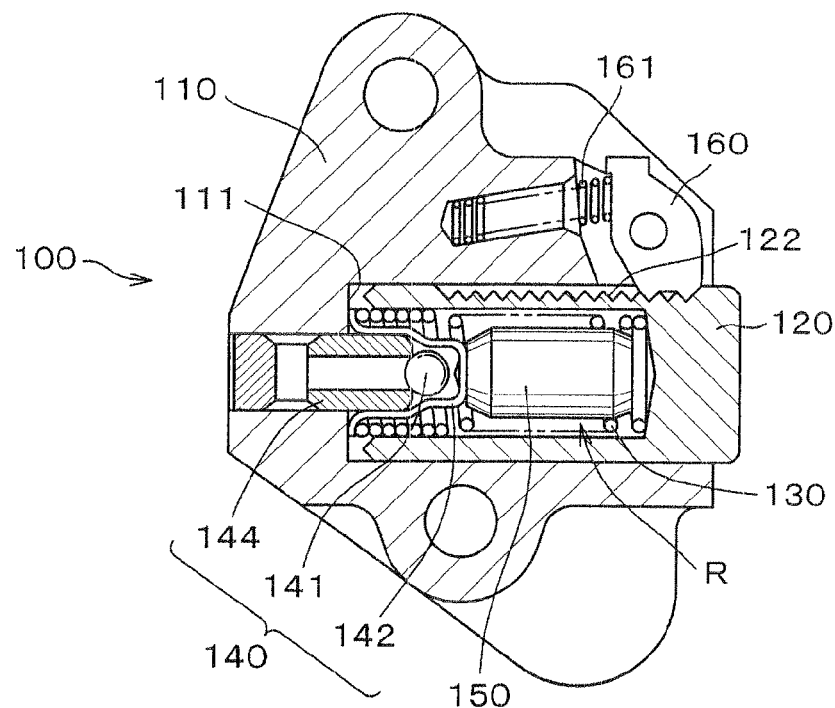
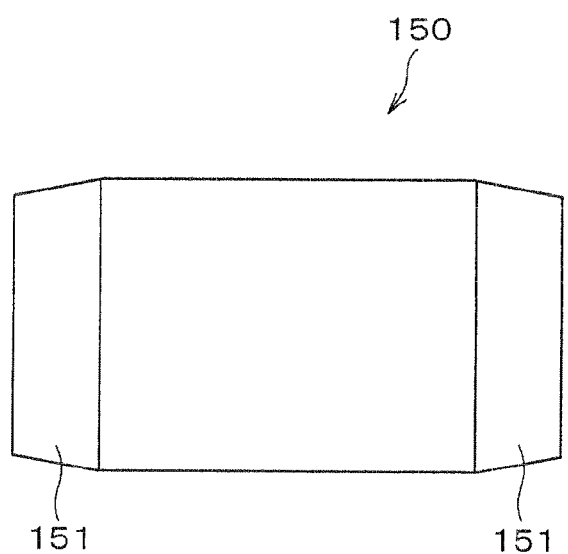
Fig. 2(a)
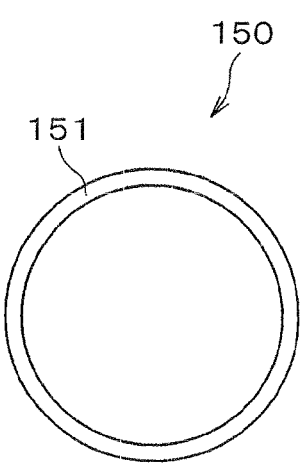
Fig. 2(b)

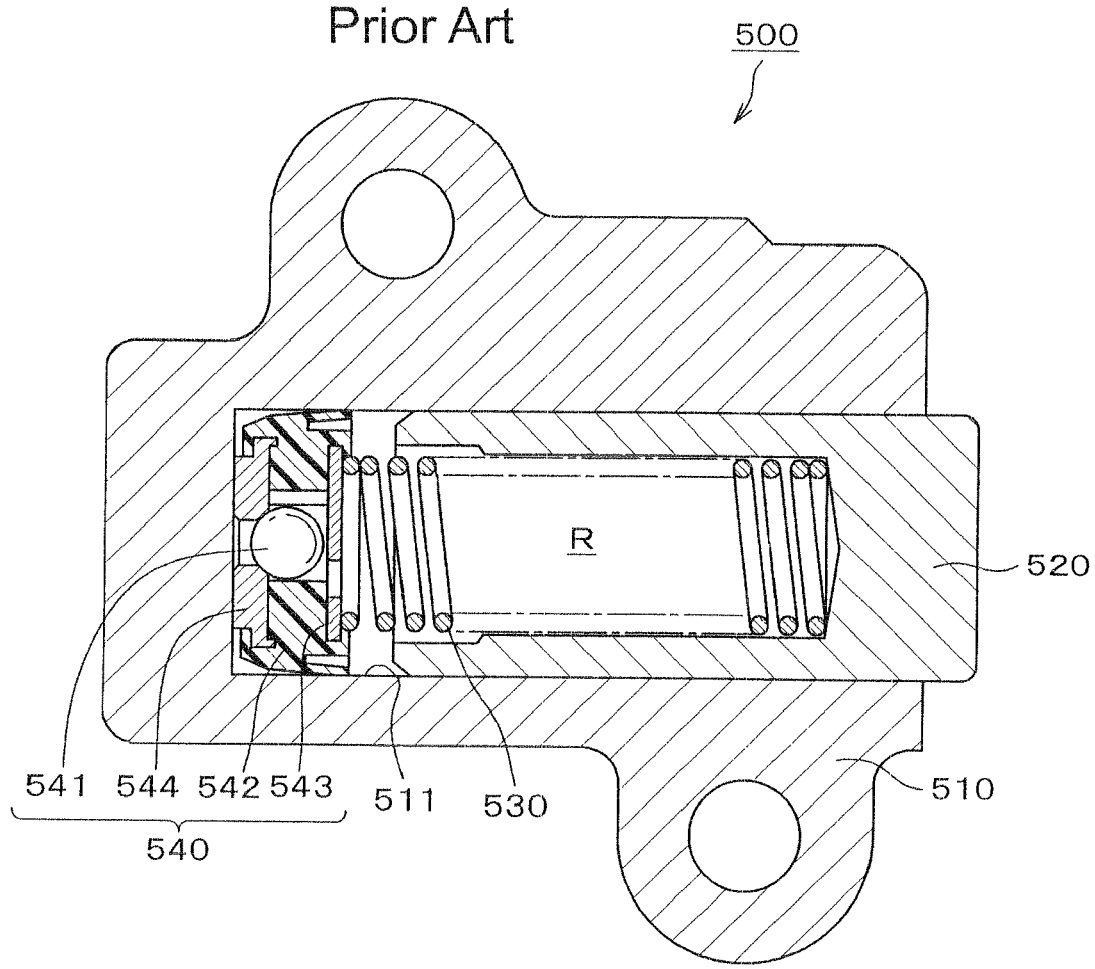

HYDRAULIC TENSIONER

CROSS-REFERENCE TO RELATED APPLICATION

This application claims priority on the basis of Japanese patent application 2008-035958, filed Feb. 18, 2008. The disclosure of Japanese application 2008-035958 is hereby incorporated by reference.

FIELD OF THE INVENTION

The invention relates to a hydraulic tensioner for maintaining proper tension in an endless, flexible, traveling transmission medium such as a timing belt, or a timing chain in a vehicle engine.

BACKGROUND OF THE INVENTION

Hydraulic tensioners incorporating check valves have been widely used to maintain proper tension, and to suppress vibration, in a timing belts or timing chain used to transmit rotation between a crankshaft and one or more camshafts in a vehicle engine.

As shown in FIG. 12, a conventional hydraulic tensioner 500 is typically mounted on an engine adjacent the slack side of a timing chain C, which is driven by a crankshaft sprocket S1 and in driving relationship with camshaft sprockets S2. A hollow plunger 520 protrudes slidably from a housing 510 and applies tension to the slack side of the timing chain C by pressing against the back of a pivoted lever L1 on which the chain slides. A fixed guide L2 is provided on the tension side of the timing chain C. The sprockets and chain move in the directions indicated by arrows in FIG. 12.

As shown in FIG. 13, in the hydraulic tensioner 500, the cylindrical plunger 520 fits slidably in a plunger-accommodating hole 511 formed in the housing 510. A high pressure oil chamber R is formed by the plunger 520 and a plunger-accommodating hole 511. The plunger is urged in the protruding direction by a plunger-biasing coil spring 530.

A check valve unit 540 is press-fit into the bottom portion of the plunger-accommodating hole 511. The check valve unit allows oil to flow from a source (not shown) of oil under pressure into the high pressure oil chamber R, but blocks reverse flow of oil.

The check valve unit 540 comprises a ball 541, a ball guide 542, which envelops the ball 541, a retainer 543, fixed to one end of the guide 542, and a ball seat 544, fixed to the opposite end of the guide 542. The ball can move toward and away from the seat through a distance limited by the retainer. When the ball guide is moved away from the seat, oil can flow through the check valve unit 540 into the high pressure oil chamber R. When the ball is in engagement with the seat, it blocks reverse flow of oil.

In operation of the tensioner, oil in the high pressure oil chamber R leaks through a slight clearance between the outer circumferential surface of the plunger 520 and the inner circumferential surface of the plunger-accommodating hole 511, and is discharged to the outside of the housing 510. Because of the viscosity of the oil, there is a resistance to flow through the clearance between the plunger and the plunger-accommodating hole. The resistance to flow enables the tensioner to exert a damping action, absorbing impact forces exerted on the plunger 520 and reducing vibration of the plunger 520. An example of a hydraulic tensioner having the above-described features is found in United States Patent Application Publication US2005/0227799.

In a conventional hydraulic tensioner, oil is supplied to the high pressure oil chamber by a pump driven by an engine. When the engine is stopped, the supply of oil to the high pressure oil chamber is also stopped. Some of the oil left in the chamber leaks through the clearance between the plunger and the inner circumferential surface of the plunger-accommodating hole and is discharged and replaced by air. When the engine is re-started after having been stopped for a long time, a considerable amount of time is required for replenishment of the oil in the high pressure oil chamber of the tensioner, and the damping action of the tensioner is therefore delayed.

The delay between the time the engine is started and the time at which the damping action of the tensioner commences can be reduced by shortening the high pressure oil chamber or reducing the thickness of the plunger-biasing spring. However, these measures reduced the load capacity and spring constant of the spring, and impair the performance of the tensioner.

The invention solves the above-described problems by providing a hydraulic tensioner in which the time interval required to replenish oil in the high pressure oil chamber following engine start-up can be significantly reduced without the need to change the properties of the plunger-biasing spring.

SUMMARY OF THE INVENTION

The hydraulic tensioner according to the invention comprises a housing having a plunger-accommodating hole formed therein, said hole having an opening and a bottom spaced from the opening, and a plunger slidably protruding from the plunger-accommodating hole, through said opening, in a protruding direction, and, with said hole, defining a high pressure oil chamber. A coil spring disposed within the high pressure oil chamber, is in compression, and biases the plunger in a protruding direction. A check valve is incorporated into the housing for allowing oil to flow into the high pressure oil chamber and blocking flow of oil out of the high pressure oil chamber. The tensioner is characterized by a bar at least a part of which is located within the coil spring. The bar reduces the volume of the high pressure oil chamber.

The check valve can be disposed in the bottom of the plunger-accommodating hole, and the bar can be capable of abutting the check valve when the plunger is in a retracted position. The tensioner can have a clearance allowing oil to flow into the high pressure oil chamber through the check valve when the bar is in abutment with the check valve.

The bar can be engaged by an end of the coil spring, and held in engagement with the plunger by pressure exerted by the coil spring. The size and shape of the bar can be such that, even when the plunger is at the limit of its sliding movement into the plunger-accommodating hole, the bar is spaced from the check valve.

In an alternative embodiment, the plunger is engaged by an end of the coil spring, and the bar is engaged by an opposite end of the coil spring, and held in engagement with the bottom of the plunger-accommodating hole by pressure exerted by the spring. In that case, if the check valve is disposed in the bottom of the plunger-accommodating hole, the bar can be shaped to provide a clearance allowing oil to flow into the high pressure oil chamber through the check valve.

In the operation of the tensioner, as the plunger is pushed into the plunger-accommodating hole in the housing as a result if increased tension in the chain or other endless, flexible power transmission medium, the volume of the high pressure oil chamber decreases, resulting in an increase in pressure that causes oil to leak through a small clearance between the outer circumferential surface of the plunger and the inner circumferential surface of the plunger-accommodating hole. The oil is then discharged to the outside of the tensioner housing. Because of the viscosity of the oil, there is a resistance to flow of oil through the leakage path, and consequently a damping action is exerted by the tensioner, absorbing the impact force acting on the plunger and rapidly damping vibration of the plunger.

The bar, at least a part of which is located within the coil spring, reduces the volume of the high pressure oil chamber. Thus, the time required for replenishment of oil in the high pressure oil chamber on start-up of an engine is reduced, and the tensioner can begin exerting its damping action almost immediately. Moreover, the volume of the high pressure oil chamber is reduced without requiring a reduction in the length, thickness, or diameter of the coil spring. Therefore, a spring having a high load capability, a low spring constant, and dimensions that are the same as those of a spring in a conventional hydraulic tensioner, can be used.

In a case in which the check valve is disposed in the bottom of the plunger-accommodating hole, and the bar is capable of abutting the check valve when the plunger is in its retracted position, a clearance allowing oil to flow into the high pressure oil chamber through the check valve when the bar is in abutment with the check valve, ensures that flow of oil into the high pressure oil chamber is not impaired. Therefore, the tensioner can maintain oil inflow at a rate corresponding to the inflow rate in a conventional tensioner, and exhibit similar damping performance.

A configuration in which the bar is engaged by an end of the coil spring, and held in engagement with the plunger by pressure exerted by the coil spring, is especially advantageous in the case in which the tensioner is mounted so that the plunger moves upward or obliquely upward as it moves in its protruding direction. The bar more effectively decreases the volume of the air space that exists above the oil level when the oil is partly depleted at the time of engine start-up. Therefore, the time required to replenish the oil in the high pressure oil chamber is shortened, and the damping action of the tensioner can be exerted almost immediately upon engine start-up.

Especially when the size and shape of the bar are such that, even when the plunger is at the limit of its sliding movement into the plunger-accommodating hole, the bar is spaced from the check valve, oil can flow into the high pressure oil chamber oil just as rapidly as in a case of a conventional hydraulic tensioner having no bar, and a similar damping performance can be exhibited.

An embodiment in which the plunger is engaged by an end of the coil spring, and the bar is engaged by an opposite end of the coil spring, and held in engagement with the bottom of the plunger-accommodating hole by pressure exerted by the spring, is particularly advantageous in the case in which the tensioner is mounted so that the plunger moves downward, or obliquely downward, as it moves in its protruding direction. In this tensioner configuration, the bar, which is held in engagement with the bottom of the plunger-accommodating hole, more effectively decreases the volume of the air space that exists above the oil level when the oil is partly depleted at the time of engine start-up. Therefore, the time required to replenish the oil in the high pressure oil chamber is shortened, and the damping action of the tensioner can be exerted almost immediately upon engine start-up.

Where the check valve is disposed in the bottom of the plunger-accommodating hole, the bar is spring-urged against the bottom of the plunger-accommodating hole, and the bar is shaped to provide a clearance allowing oil to flow into the high pressure oil chamber through the check valve, the rate of flow of oil into the high pressure oil chamber can be similar to the rate of inflow of oil in a conventional tensioner having no bar, and a similar damping performance can be achieved.

BRIEF DESCRIPTION OF THE DRAWINGS

FIG. 1 is a cross-sectional view of a hydraulic tensioner in accordance with a first embodiment of the invention;

FIG. 2(a) is a side elevational view of a bar of the tensioner of FIG. 1;

FIG. 2(b) is an end elevational view of the bar of FIG. 2(a);

FIG. 13 is a cross-sectional view of a conventional hydraulic tensioner.

DETAILED DESCRIPTION OF THE PREFERRED EMBODIMENTS

Figure 3:
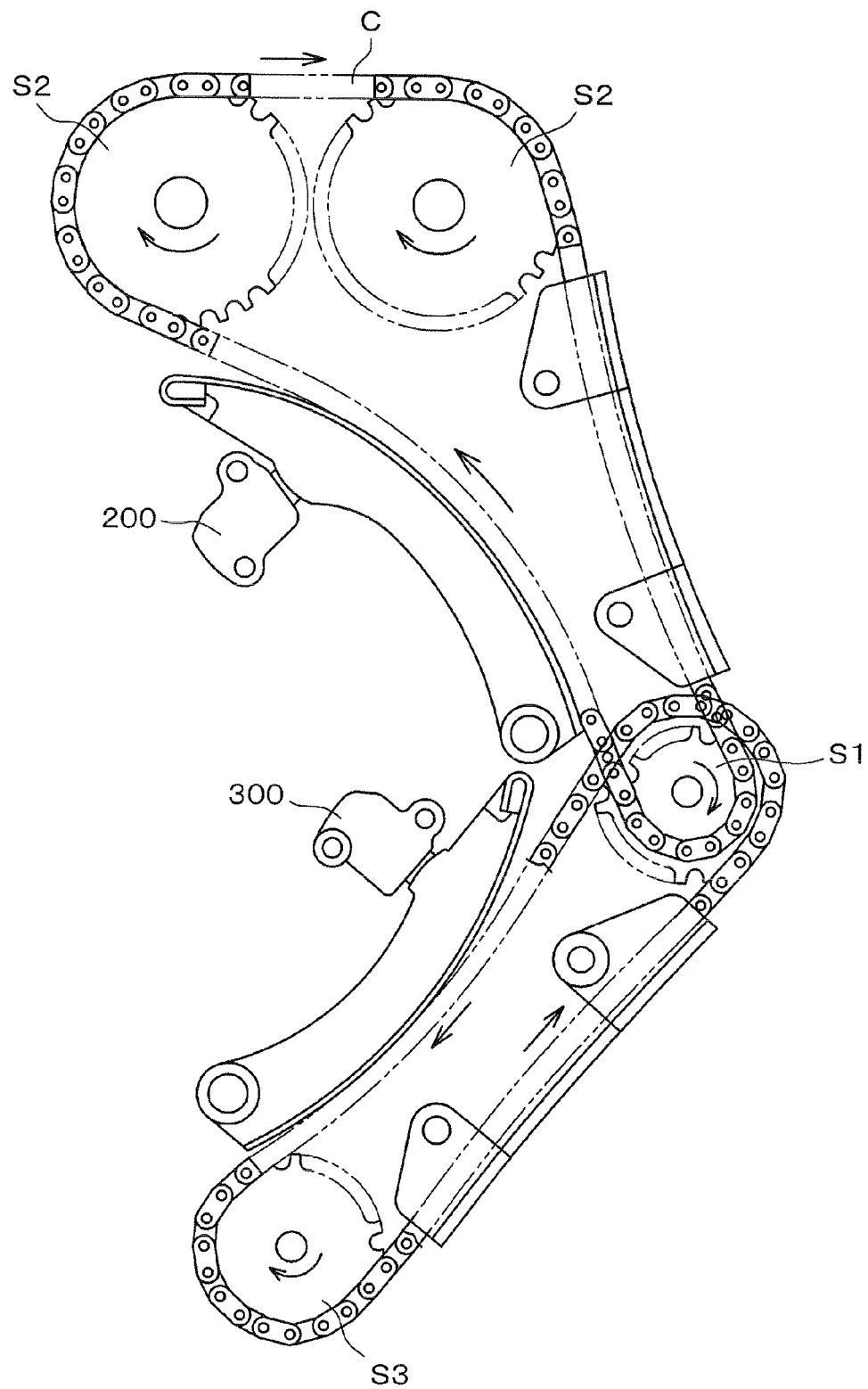
FIG. 3 is an elevational view of an engine timing transmission incorporating hydraulic tensioners according to second and third embodiments of the invention.

Briefly, the hydraulic tensioner according to the invention is similar to a conventional hydraulic tensioner, but characterized by a bar that reduces the volume of the high pressure oil chamber of the tensioner. The reduction in the volume of the high pressure oil chamber shortens the time required for replenishment of oil into the chamber on engine start-up. The bar is accommodated, at least partly, within the tensioner's plunger-biasing coil spring, and consequently a spring having a length and thickness, a load capacity, and a low spring constant, similar to those of a spring in a conventional tensioner, can be used.

The tensioner can utilize any of various types of check valves, and the bar can be composed of any of various materials, including, for example, a metal such as iron, or a resin or the like.

In the hydraulic tensioner 100, shown in FIG. 1, a hollow, cylindrical, plunger 120, having a longitudinal rack 122 of ratchet teeth, protrudes from, and is slidable in, a plunger-accommodating hole Ill in a housing 110. A plunger-biasing spring 130, in the form of a helical coil spring, urges the plunger 120 in the protruding direction, and is accommodated in a high pressure oil chamber R formed by the plunger 120 and the plunger-accommodating hole 111.

A check valve unit 140 is incorporated into the bottom of the plunger-accommodating hole 111 to allow flow of oil from a source (not shown) of oil under pressure into the high pressure oil chamber R while blocking reverse flow.

The check valve unit 140 comprises a check ball 141, a ball seat 144, and a ball retainer 142, which envelops the ball while allowing the ball to move freely toward and away from the ball seat.

The rack 122 formed on the plunger 120 is engaged by a ratchet pawl 160, which is pivoted on the housing 110 and biased by a spring 161 into engagement the rack 122 to allow the plunger to move in the protruding direction while limiting retraction of the plunger to an amount corresponding to the backlash of the ratchet mechanism.

The plunger-biasing spring 130 has a high load capacity and a low spring constant, and has the length and thickness necessary in order to perform adequately as a plunger-biasing spring in a hydraulic tensioner. A bar 150 is incorporated into the space inside the plunger-biasing spring 130.

As shown in FIGS. 1, 2(a) and 2(b), bar 150 is in the form of a circular cylinder having tapered ends 151 in the form of truncated cones. The bar can be a solid bar of metal, resin or other suitable material. The outer diameter of the bar 150 of the cylindrical part of the bar is slightly smaller than the inner diameter of the helical coil spring 130.

The bar 150 reduces the volume of the high pressure oil chamber R by an amount corresponding to the volume of the bar. However, the bar does not prevent, or interfere with, extension and contraction of the plunger-biasing spring 130, nor does it prevent, or interfere with, the flow of oil in the high pressure oil chamber R.

The retainer 142 of the check valve unit 140 has openings for the flow of oil into the high pressure oil chamber. These openings are formed on the sides of the retainer or at other positions such that they are not blocked when the retainer is abutted by the bar 150.

The tensioner of FIG. 1 can be used to maintain tension in the belt or chain of the timing drive of an internal combustion engine. The bar 150 reduces the space available for oil within the high pressure oil chamber R, if the chamber R is not completely filled with oil as a result of leakage of oil past the plunger 120 when the engine is not operating. As a result, the interval required for replenishment of oil in the chamber R is significantly reduced, and the damping action of the tensioner can commence substantially immediately upon engine start-up. In addition, since the bar 150 is disposed within the helical coiled plunger-biasing spring, the length of the spring and its thickness do not need to be reduced. Thus, the spring can have a high load capacity and low spring constant corresponding to those of a plunger-biasing spring in a conventional tensioner, and the tensioner can therefore exhibit performance equivalent to that of a conventional tensioner, with the added advantage that its damping action can commence substantially immediately upon engine start-up.

The tensioner of FIG. 1 is typically used in an application in which the movement of the plunger is horizontal, but can be used in various other applications.

Figure 4:
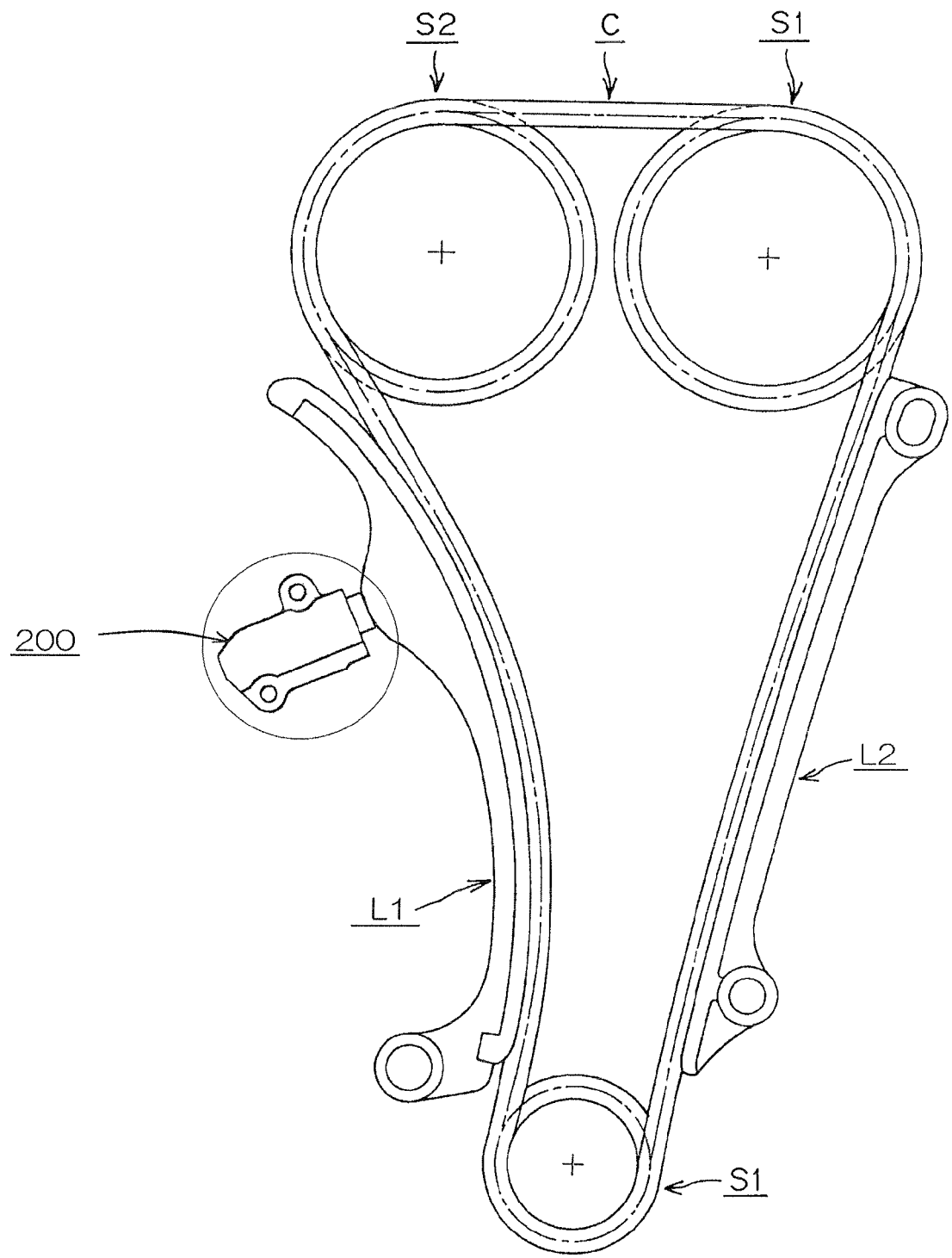
FIG. 4 is an elevational view of another engine timing transmission incorporating a hydraulic tensioner according to the second embodiment of the invention.
Figure 5:
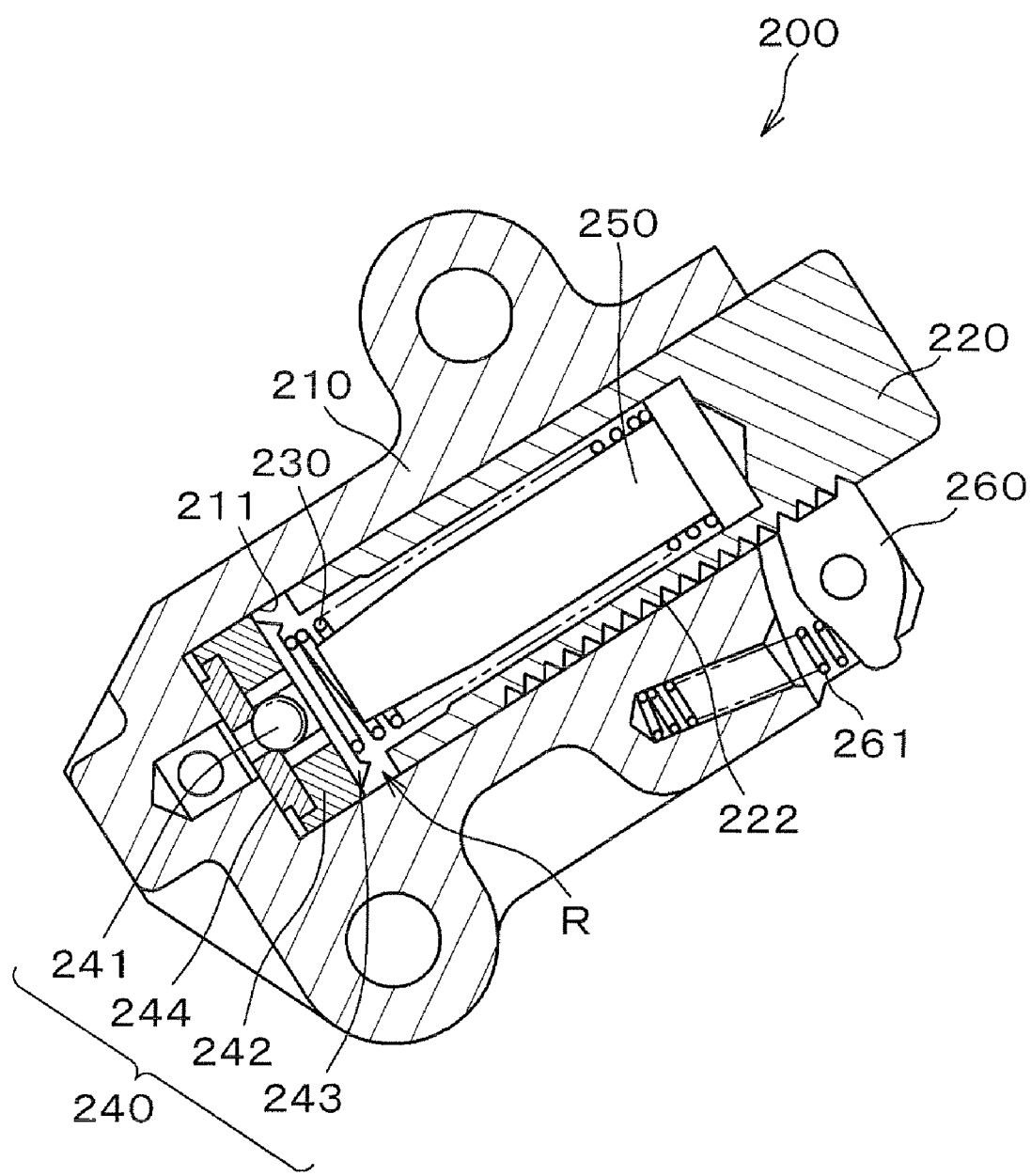
FIG. 5 is a cross-sectional view of a hydraulic tensioner in accordance with the second embodiment of the invention.

However, in applications in which the outer end of the plunger moves upward as the plunger protrudes, another embodiment can exhibit advantages. Tensioners 200 in FIGS. 3 and 4 are examples of tensioners in which the outer end of the plunger moves upward as the plunger protrudes. As shown in FIG. 5, in tensioner 200, a hollow cylindrical plunger 220 is slidable in a plunger-accommodating hole 211 formed in a housing 210, and a plunger-biasing coil spring 230 urges the plunger 220 in a protruding direction. The spring is accommodated in a high pressure oil chamber R formed by the plunger 220 and the plunger-accommodating hole 211. The plunger-biasing spring 230 can have a length, and thickness, a high load capacity, and a low spring constant, equivalent to those of a plunger-biasing spring in a conventional tensioner of the same size.

A check valve unit 240 is incorporated into the bottom of the plunger-accommodating hole 211 to allow Oil to flow into chamber R while blocking reverse flow. The check valve unit 240 comprises a check ball 241, a ball guide 242, which envelops the check ball, allowing the check ball to move freely, within limits, toward and away from a seat 244. A retainer 243 secured to the ball guide 242, limits movement of the check ball 241 away from the seat 244. The retainer has one or more passages (not shown) that allow oil to flow from the check valve unit into the high pressure oil chamber. The retainer 243 also serves as a seat, receiving an end of the plunger-biasing spring 230.

An optional ratchet mechanism, comprises a rack 222 formed on the plunger 220, and a pawl 260 pivoted to the housing 210 and biased by a ratchet biasing spring 261 toward the rack 222. The ratchet mechanism allows the plunger to move in the protruding direction, but limits reverse movement of the plunger to an amount corresponding to the backlash of the ratchet mechanism.

A bar 250 is provided with most of its length disposed inside the coiled plunger-biasing spring 230.

Figure 6:
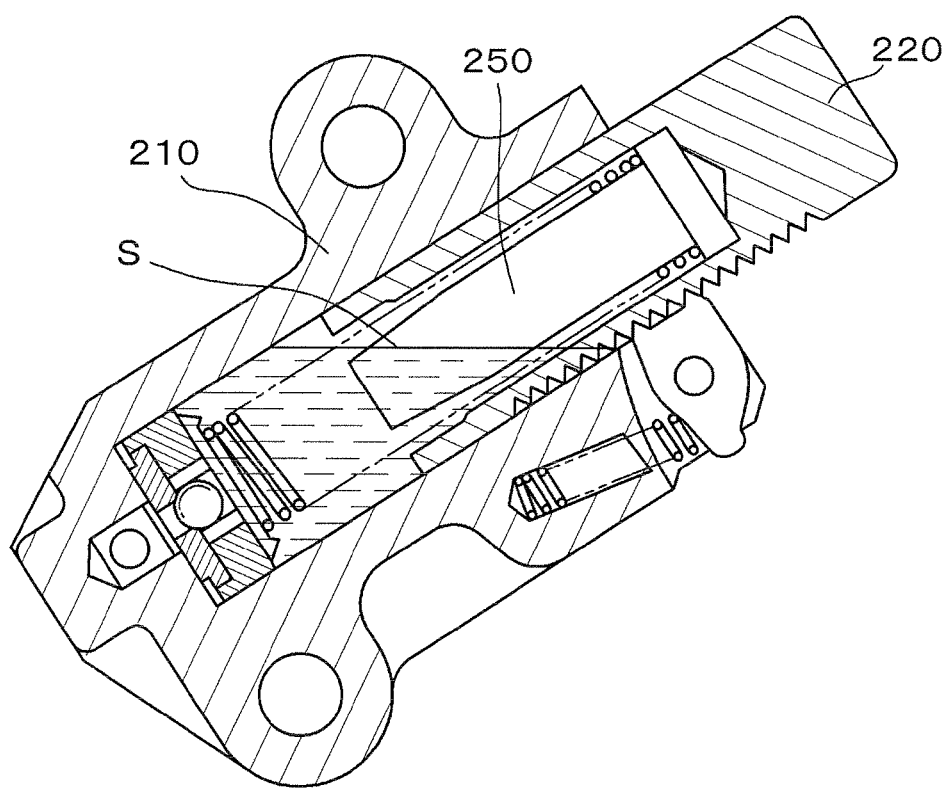
FIG. 6 is a cross-sectional view showing the tensioner of FIG. 5 with its plunger in a protruding condition.
Figure 7:
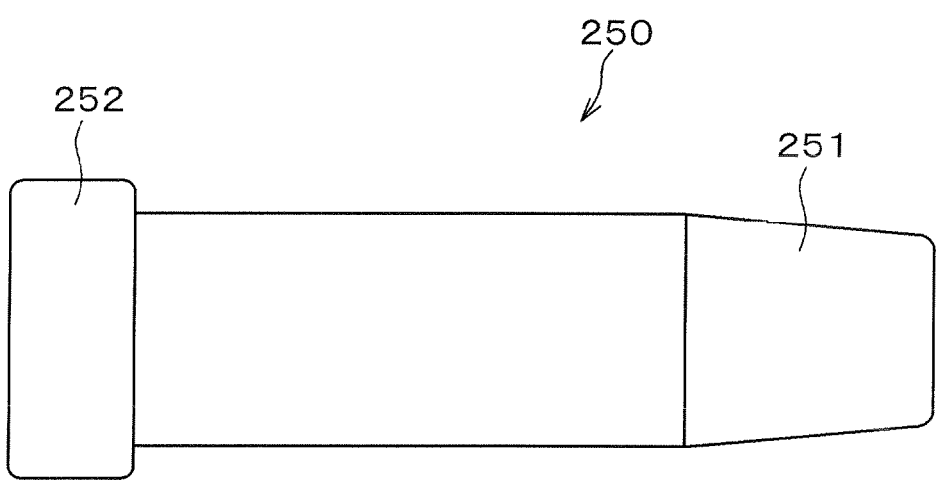
FIG. 7 is side elevational view of a bar of the tensioner of the second embodiment.
Figure 8:
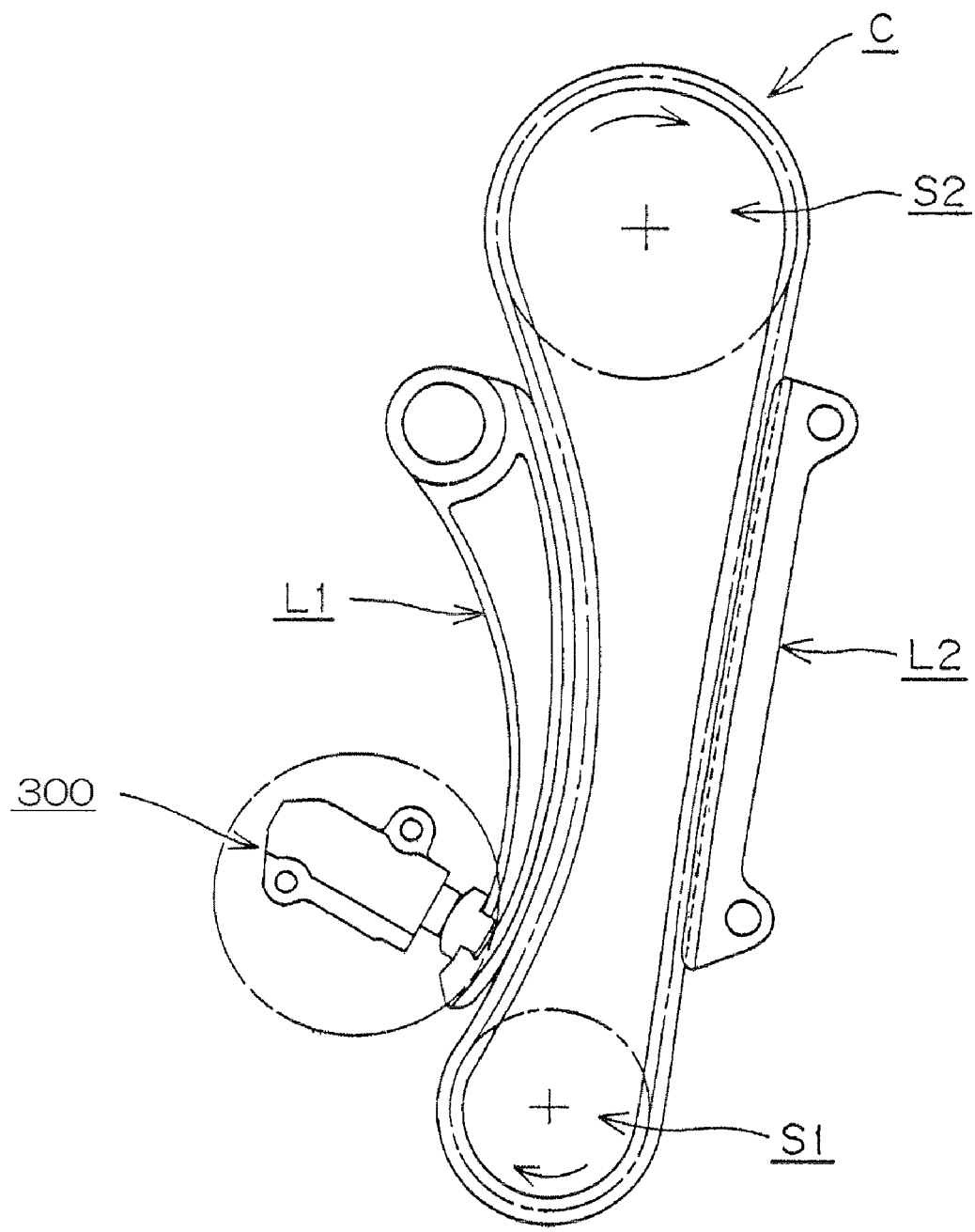
FIG. 8 an elevational view of another engine timing transmission incorporating a hydraulic tensioner according to the third embodiment of the invention.

The main part of the length of the bar 250 is in the form of a circular cylinder, having an outer diameter slightly less than the inner diameter of the plunger-biasing spring 230. As shown in FIG. 7, one end of the bar 250 has a larger diameter stepped portion 252 for engagement by an end of the plunger-biasing spring 230 as shown in FIGS. 5 and 6. The opposite end of the bar 250 has a taper 251 in the form of a truncated cone. The bar 250 reduces the volume of the high pressure oil chamber R by an amount corresponding to the volume of the bar, but does not interfere with extension and contraction of the plunger-biasing spring 230, and does not interfere with the flow of oil into the high pressure oil chamber R.

The tapered part 251 of the bar 250 is on the end of the bar adjacent the check valve unit 240, and the larger diameter stepped portion 252 is on the opposite end of the bar. The ends of the plunger-biasing spring 230 are received respectively by the retainer 243 of the check valve unit 240 and the large diameter stepped portion 252 of the bar 250. Consequently, the bar 250 moves together with the plunger 220, as the plunger moves in the protruding direction, and as the plunger retracts.

The length of the bar 250 can be such that it can abut the retainer 243 of the check valve unit 240 when the plunger is fully retracted. However, because its end is tapered, the retainer-engaging end of the bar is separated from the retainer-engaging end of the spring, and consequently the bar does not prevent flow of the oil into the high pressure oil chamber.

As in the case of the first embodiment, the bar 250 reduces the space available for oil within the high pressure oil chamber R, if the chamber R is not completely filled with oil as a result of leakage of oil past the plunger 220 when the engine is not operating. As a result, the interval required for replenishment of oil in the chamber R is significantly reduced, and the damping action of the tensioner can commence substantially immediately upon engine start-up. In addition, since the bar 250, except for the larger-diameter stepped portion, is disposed within the helical coiled plunger-biasing spring, the length of the spring and its thickness do not need to be reduced. Thus, the spring can have a high load capacity and low spring constant corresponding to those of a plunger-biasing spring in a conventional tensioner, and the tensioner can therefore exhibit performance equivalent to that of a conventional tensioner, with the added advantage that its damping action can commence substantially immediately upon engine start-up.

When the plunger 220 protrudes upward or obliquely upward as shown in FIGS. 3 and 4, instead of horizontality, the oil within the high pressure oil chamber R oil is on the check valve side of the high pressure oil chamber, and can reach a level S as a result of leakage when the engine is stopped. The level S corresponds to the level of the lowest point of the opening of the housing through which the plunger protrudes. Because the bar 250 moves together with the plunger 220, the empty space above the oil level S is small even when the protrusion of the plunger 220 is large. Thus, the damping action of the tensioner can take place almost immediately upon starting of the engine.

Figure 9:
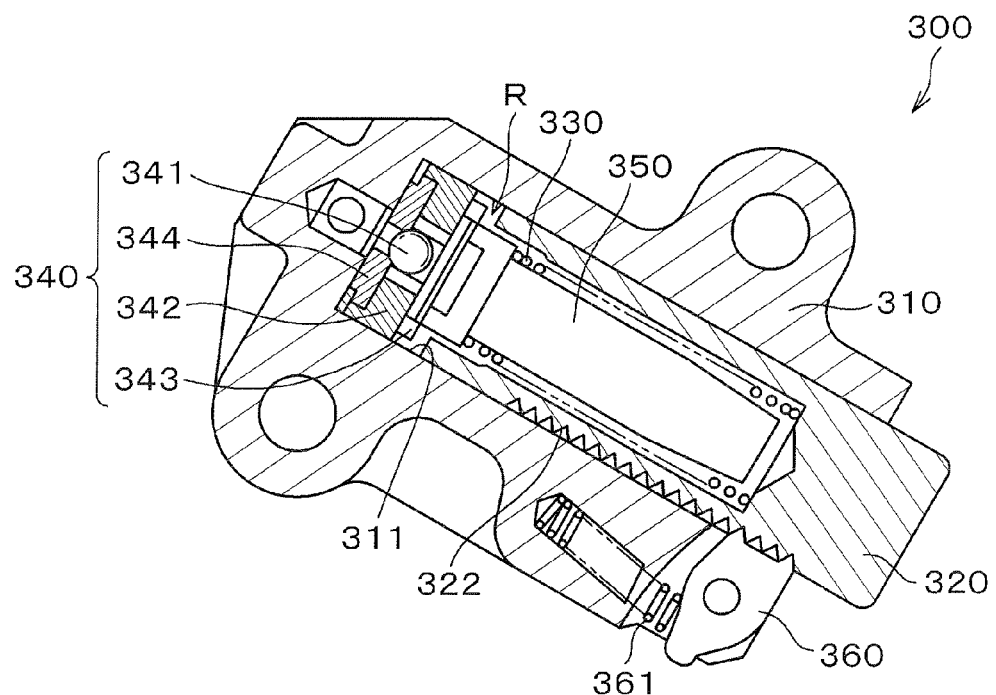
FIG. 9 is a cross-sectional view of a hydraulic tensioner in accordance with the third embodiment of the invention.
Figure 10:
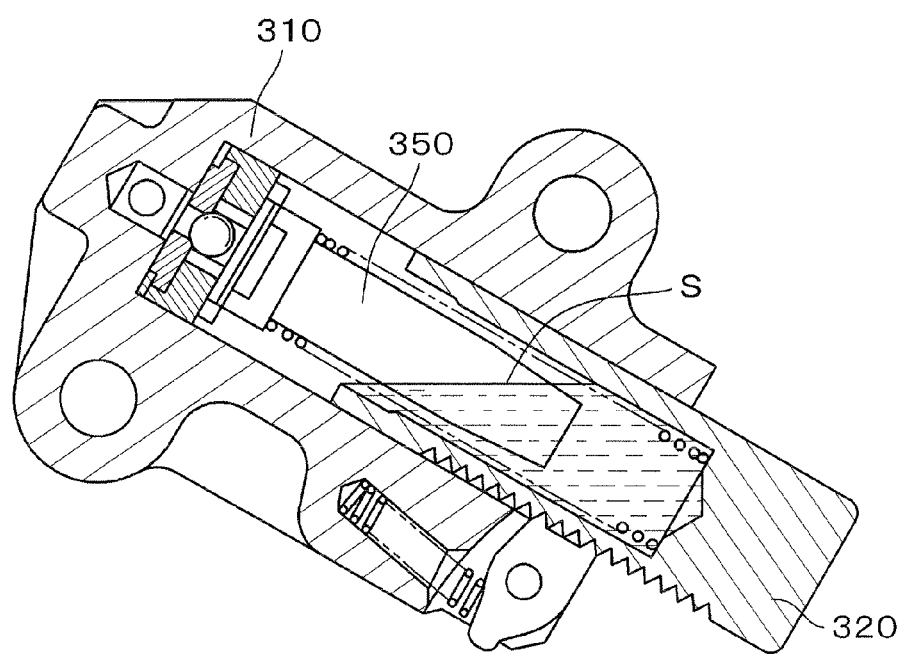
FIG. 10 is a cross-sectional view showing the tensioner of FIG. 9 with its plunger in a protruding condition.

In the case of the hydraulic tensioner 300, in which the plunger protrudes downward, or obliquely downward as shown in FIG. 9, a cylindrical plunger 320 is slidable in a plunger-accommodating hole 311 formed in a housing 310, and a plunger-biasing coil spring 330 urges the plunger 320 in the protruding direction. The spring is accommodated in a high pressure oil chamber R formed by the plunger 320 and the plunger-accommodating hole 311.

A check valve unit 340 is incorporated into the bottom of the plunger-accommodating hole 311 to allow oil to flow into chamber R while blocking reverse flow. The check valve unit 30 a check ball 341, a ball guide 342, which envelops the check ball, allowing the check ball to move freely, within limits, toward and away from a seat 344. A retainer 343 secured to the ball guide 342, limits movement of the check ball 341 away from the seat 344. The retainer has one or more ports (not shown) that allow oil to flow from the check valve unit into the high pressure oil chamber. An optional ratchet mechanism, comprises a rack 322 formed on the plunger 320, and a pawl 360 pivoted to the housing 310 and biased by a ratchet biasing spring 361 toward the rack 322. The ratchet mechanism allows the plunger to move in the protruding direction, but limits reverse movement of the plunger to an amount corresponding to the backlash of the ratchet mechanism.

Figure 11:
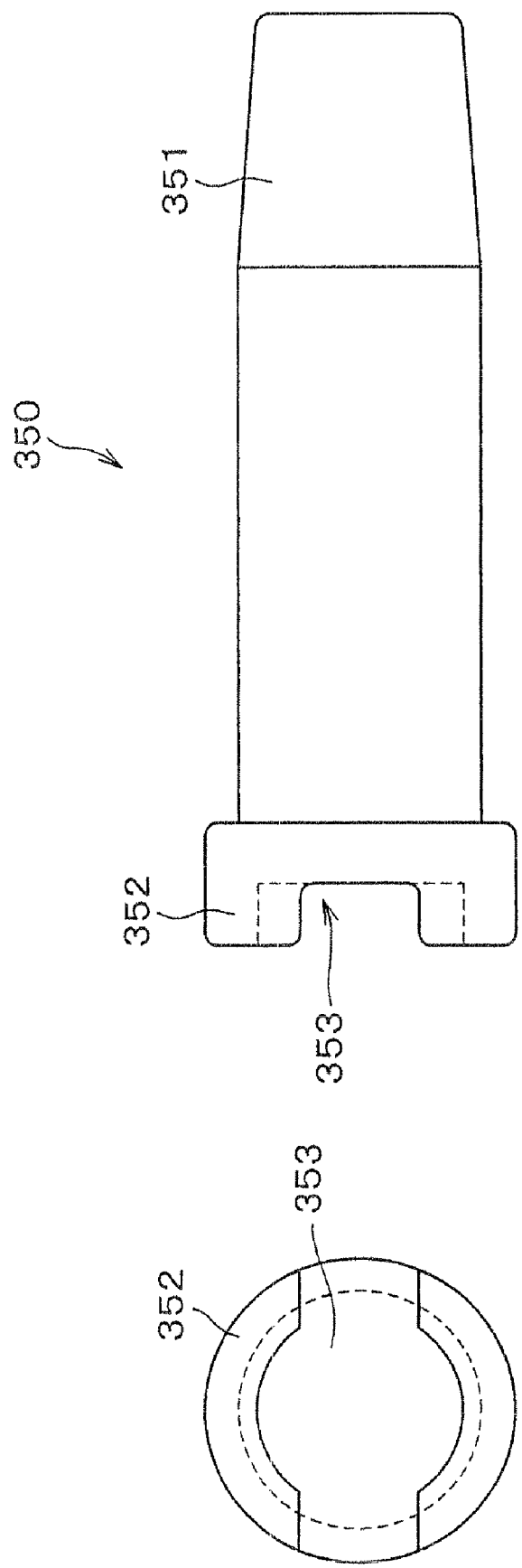
FIG. 11(a) is a side elevational view of the bar of the tensioner according to the third embodiment.
FIG. 11(b) is an end elevational view of the bar of FIG. 11(a)
Figure 12:
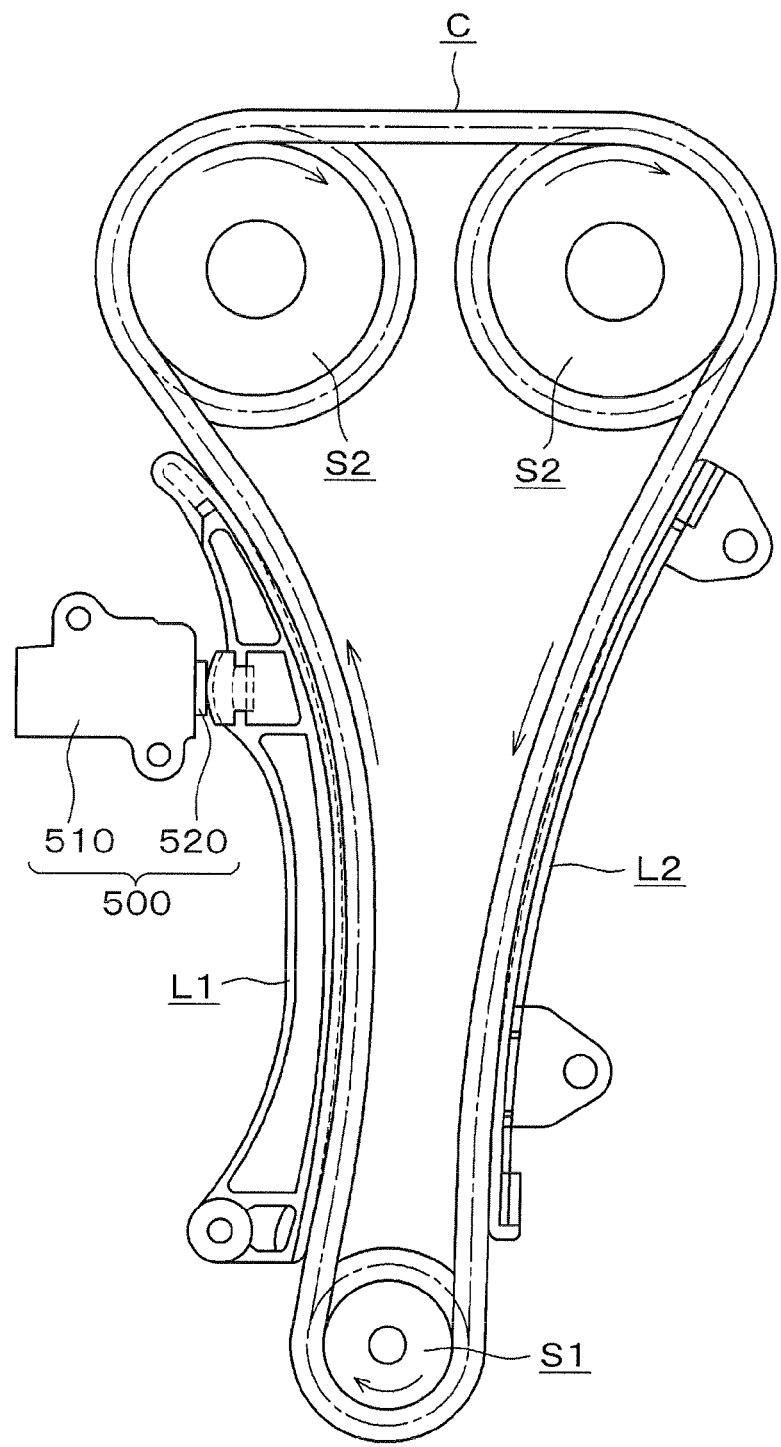
FIG. 12 is an elevational view of a conventional timing transmission.

A bar 350 is provided with most of its length disposed inside the coiled plunger-biasing spring 330. The outer diameter of the bar 350 is slightly smaller than the inner diameter of the plunger-biasing spring 330, and the major portion of the bar 250 has a cylindrical shape. One end of the bar 350 has a larger diameter stepped portion 352, which is engaged by the end of the plunger-biasing spring 330 nearest the bottom of the plunger-accommodating hole. The other end of the bar 350 has a tapered surface 351 forming a truncated cone, as shown in FIG. 11(a). The end surface of the larger diameter stepped portion 352 abuts the retainer 343, but does not engage the ports of the retainer so that it does not interfere with the flow of oil into the high pressure oil chamber. A groove 353, formed in the end surface of the larger diameter portion of the bar, provides a clearance sufficiently large to allow oil, supplied through the check valve and through the ports of the retainer, to flow substantially without resistance, into the high pressure oil chamber R. The bar 350 reduces the volume of high pressure oil chamber R without inhibiting extension and contraction of the plunger-biasing spring 330 and without interfering with the flow of oil into the oil chamber R.

The large diameter stepped portion 352 of the bar 350 is engaged with the check valve unit 340, and the tapered surface 351 of the bar extends into the plunger 320. The ends of the plunger-biasing spring 330 are respectively engaged with the large diameter stepped portion 352 of the bar 350 and with the plunger 320. As the plunger slides relative to the housing 310, the bar 350 remains in fixed relation to the housing.

The length of the bar 350 is such that the bar 350 does not abut the plunger 320, if at all, until the plunger is in its fully retracted condition. Consequently, the bar does not limit the stroke of the plunger.

As in the first and second embodiments, the bar 350 reduces the space available for oil within the high pressure oil chamber R, if the chamber R is not completely filled with oil as a result of leakage of oil past the plunger 320 when the engine is not operating. As a result, the interval required for replenishment of oil in the chamber R is significantly reduced, and the damping action of the tensioner can commence substantially immediately upon engine start-up. In addition, since the bar 350, except for the larger-diameter stepped portion, is disposed within the helical coiled plunger-biasing spring, the length of the spring and its thickness do not need to be reduced. Thus, the spring can have a high load capacity and low spring constant corresponding to those of a plunger-biasing spring in a conventional tensioner, and the tensioner can therefore exhibit performance equivalent to that of a conventional tensioner having no bar, with the added advantage that its damping action can commence substantially immediately upon engine start-up.

When the plunger 320 protrudes downward or obliquely downward as shown in FIGS. 3, 8, 9 and 10, instead of horizontality, the oil within the high pressure oil chamber R is on the side of the high pressure oil chamber remote from the check valve, and can reach a level S as a result of leakage when the engine is stopped. The level S corresponds to the level of the lowest point of the opening of the hollow plunger. Because the bar 350 is fixed relative to the housing 310, the empty space above the oil level S is small even when the protrusion of the plunger 320 is large. Thus, the damping action of the tensioner can take place almost immediately upon starting of the engine.

We claim:
1. A hydraulic tensioner comprising:
   a housing having a plunger-accommodating hole formed therein, said hole having an opening and a bottom spaced from the opening;
   a plunger slidably protruding from the plunger-accommodating hole, through said opening, in a protruding direction, and, with said hole, defining a high pressure oil chamber, said plunger being movable along said protruding direction from a retracted position to a protruding position;
   a coil spring disposed within the high pressure oil chamber, said spring being in compression and biasing the plunger in said protruding direction;
   a check valve incorporated into the housing, and disposed at the bottom of said plunger-accommodating hole, for allowing oil to flow into the high pressure oil chamber and blocking flow of oil out of the high pressure oil chamber; and
   a bar having a front end and a rear end, the front end being spaced in said protruding direction from the rear end, and a part of the bar being located within said coil spring, the bar reducing the volume of the high pressure oil chamber;
   in which the plunger is engaged by an end of the coil spring, and the bar is engaged by an opposite end of the coil spring, and held in engagement with a surface adjacent the bottom of the plunger-accommodating hole by pressure exerted by said spring; and in which the bar is shaped to provide a clearance allowing oil to flow into the high pressure oil chamber through the check valve.

2. A hydraulic tensioner according to claim 1, in which the surface with which the bar is held in engagement is a surface of the check valve.

3. A hydraulic tensioner according to claim 1, in which said clearance is provided by a groove formed in said rear end of the bar, said groove extending transverse to said protruding direction.

4. A hydraulic tensioner according to claim 3, in which said clearance is provided by a groove formed in said enlargement, said groove extending transverse to said protruding direction.

5. A hydraulic tensioner according to claim 1, in which the bar has an enlargement adjacent said rear end, and said opposite end of the coil spring is in engagement with said enlargement.

* * * * *

UNITED STATES PATENT AND TRADEMARK OFFICE
CERTIFICATE OF CORRECTION

| | | |
|---|---|---|
| PATENT NO. | : 8,033,938 B2 | Page 1 of 1 |
| APPLICATION NO. | : 12/354292 | |
| DATED | : October 11, 2011 | |
| INVENTOR(S) | : Yuji Kurematsu and Takeshi Ogawa | |

It is certified that error appears in the above-identified patent and that said Letters Patent is hereby corrected as shown below:

Column 7, line 27, "30" should read -- 340 comprises --;

Signed and Sealed this
Thirty-first Day of January, 2012

David J. Kappos
*Director of the United States Patent and Trademark Office*